United States Patent [19]

VanSant

[11] Patent Number: 4,754,447
[45] Date of Patent: Jun. 28, 1988

[54] MULTIDISK SPINDLE

[75] Inventor: Glen J. VanSant, Penndel, Pa.

[73] Assignee: RCA Corporation, New York, N.Y.

[21] Appl. No.: 7,535

[22] Filed: Jan. 28, 1987

[51] Int. Cl.$^4$ .................. G11B 33/14; G11B 5/82; G11B 7/00
[52] U.S. Cl. ........................... 369/270; 360/98
[58] Field of Search .............. 369/270, 280, 281, 282, 369/289, 290; 360/97, 98

[56] References Cited

U.S. PATENT DOCUMENTS

| | | | |
|---|---|---|---|
| 3,801,476 | 4/1974 | Röschmann et al. | 369/282 |
| 4,097,895 | 6/1978 | Spong | 358/128 |
| 4,449,212 | 5/1984 | Reno | 369/44 |
| 4,503,530 | 3/1985 | Hinlein et al. | 369/282 |
| 4,577,756 | 3/1986 | Hennessy et al. | 369/280 |
| 4,644,515 | 2/1987 | Allebest et al. | 369/34 |

FOREIGN PATENT DOCUMENTS 90382   5/1986   Japan .................................. 369/270

Primary Examiner—Steven L. Stephan
Attorney, Agent, or Firm—Clement A. Berard, Jr.; Raymond E. Smiley

[57] ABSTRACT

A multidisk spindle includes a plurality of mounting plates affixed to a shaft for mounting an equal plurality of record disks thereon such that the disks are parallel to each other and perpendicular to the rotational axis of the shaft. The shape of the mounting plates and their dimensions relative to the central apertures of the record disks permit the record disks to be mounted to the spindle after it has been fully assembled. In this way the assembled mounting plates may be abraded to provide plane disk-mounting surfaces which are parallel to each other and perpendicular to the axis of rotation.

11 Claims, 4 Drawing Sheets

MULTIDISK SPINDLE

The U.S. Government has rights in this invention pursuant to a Government Contract.

The present invention relates generally to disk storage systems and, more particularly, to a spindle for mounting and precisely positioning a plurality of disks thereon, and to a method for assembling the disks on the spindle.

BACKGROUND OF THE INVENTION

During the next decade, the vastly increased amount of information that will be generated by advanced sensors and computing systems must be captured and stored by a new generation of high data rate, high capacity recording and buffering systems that provide rapid, reliable access to the stored data. As an example, the Space Telescope is expected to generate a terabyte ($10^{12}$ bytes) of data per year during its 15-year planned life. A computer compatible magnetic tape archiving system for this amount of data would consist of approximately 100,000 tapes at 150 megabytes per tape. As a more dramatic example, the Space Station to be launched in the early 1990's is expected to generate a terabyte of data per day at data rates that can exceed a gigabit ($10^9$ bits) per second. For the same reasons that the archival storage technology will be severly strained to meet the challenge of storing this veritable flood of information, so also will the data buffering technology, in its attempt to provide equipment which will receive, temporarily store, access, and transfer vast quantities of data on a real time basis.

High density optical recording systems which may be used for recording and playing back information are known in the prior art. For example, U.S. Pat. No. 4,097,895, entitled "MULTI-LAYER OPTICAL RECORD," issued on June 27, 1978, to F. W. Spong, relates to an optical disk record/playback system herein data are recorded on the surface of a recording medium. In a Spong system the thermal energy of a focused high intensity light beam causes variations in the optical properties on the surface of the recording medium. For example, in one system the thermal effects of a laser beam form pits in an absorptive coating on the surface of an optical disk. In the Spong system, approximately $10^{11}$ bits of information can be recorded on one side of a disk-shaped record medium having a thirty centimeter diameter.

Although the system of the previous example is directed toward archival, or permanent, storage, there have developed in recent years erasable media and recording techniques. Currently, magneto-optic materials are used in the state-of-the-art recording media to effect readily alterable recordings. A magneto-optic recording medium is a magnetic material which causes the polarization angle of laser light to be changed when reflected from a recorded spot. In preparation for recording or playback operation, the molecules of the magneto-optic material across the entire recording surface are vertically oriented in one direction. During recording, the molecules of the magneto-optic material at the point of incidence of a laser beam are flipped in the opposite direction due to the presence of a magnetic field of a given strength and polarity and the heating induced by the laser. Illumination from a playback laser beam of lower power reflected from this area will show a polarization angle change. The erasing technique then is to restore the molecular orientation condition which existed prior to recording and/or playback with a magnetic field and continuous wave laser beam present.

Information recording and retrieval systems are also known where the rate at which information is recorded or played back may be increased by two, three or more times over a Spong type system by recording or playing back multiple tracks of information simultaneously. In U.S. Pat. No. 4,449,212, issued May 15, 1984, to C. W. Reno, the output of a single gas laser is split into multiple beams which, for purposes of recording, are independently modulated and used to simultaneously record data at extremely high rates on the surface of an optical disk. In the playback mode, the Reno apparatus splits the laser output beam into multiple, constant intensity, low power beams for illuminating the recorded tracks.

At the present time, the apparent practical upper limit of the data rate of a Spong type system is in the order of 25 megabits per second. Adding multi-track capability, as in the Reno patent, of, for example, nine data tracks, still achieves less than one-quarter gigabit per second operation. In order to record incoming data and playback previously stored data at the one gigabit per second rate mentioned earlier, an information buffering system must be capable of providing data rates in excess of one gigabit per second, in order to account for the overhead of information processing.

U.S. patent application, Ser. No. 803,003 filed Nov. 29, 1985, for M. L. Levine et al., and assigned to the same assignee as the present invention, discloses a multi-disk optical information system which includes twelve disks each having two erasable recording surfaces. Independently controllable optical platforms, driven by linear motors, move the twenty-four optical heads radially across the disks so as to follow preformatted pilot tracks permanently scribed on the disk surfaces. Each optical head can record/playback eight simultaneous data tracks, so that the system can potentially provide 192 data channels. The erasable recording medium on the disk surfaces is a magneto-optic substance with the result that the disks may be reused an unlimited number of times.

The key structural component of the Levene et al. optical information system is the multidisk spindle, a rotating shaft to which the optical disks are mounted. The disks of this system are typically fourteen inches in diameter. It is of utmost importance that the disks be positioned and aligned on the shaft such that all disks rotate in parallel with each other and perpendicular to the centerline of the shaft. Furthermore, during assembly, the disks must be axially positionable such that the performatted disk tracks are concentric with the axis of rotation of the spindle, typically the shaft centerline.

SUMMARY OF THE INVENTION

In accordance with the principles of the present invention there is disclosed a spindle for mounting a plurality of record disks. Each record disk has a surface for storing information thereon and has a generally circular central aperture of predetermined diameter. The spindle comprises a shaft having an outer diameter less than the predetermined diameter of the central aperture. The spindle further comprises a plurality of mounting plates affixed to the shaft. Each mounting plate has a flat surface for mounting a record disk thereagainst such that the information surfaces of the mounted disks are parallel to each other and are perpendicular to the longitudinal axis of the shaft. The flat surface of each of the plurality of mounting plates has an outer peripheral edge comprising two arcuate curves of substantially equal length interposed between two straight segments of substantially equal length and which are substantially parallel to each other. The arcuate curves comprise arcs of a circle having its center on the longitudinal axis of the shaft and having diameter greater than the predetermined diameter of the record disk central aperture. The distance between the two straight segments of the mounting plate peripheral edge is less that the predetermined diameter of the record disk central aperture.

DETAILED DESCRIPTION OF THE DRAWING

Figure 1:
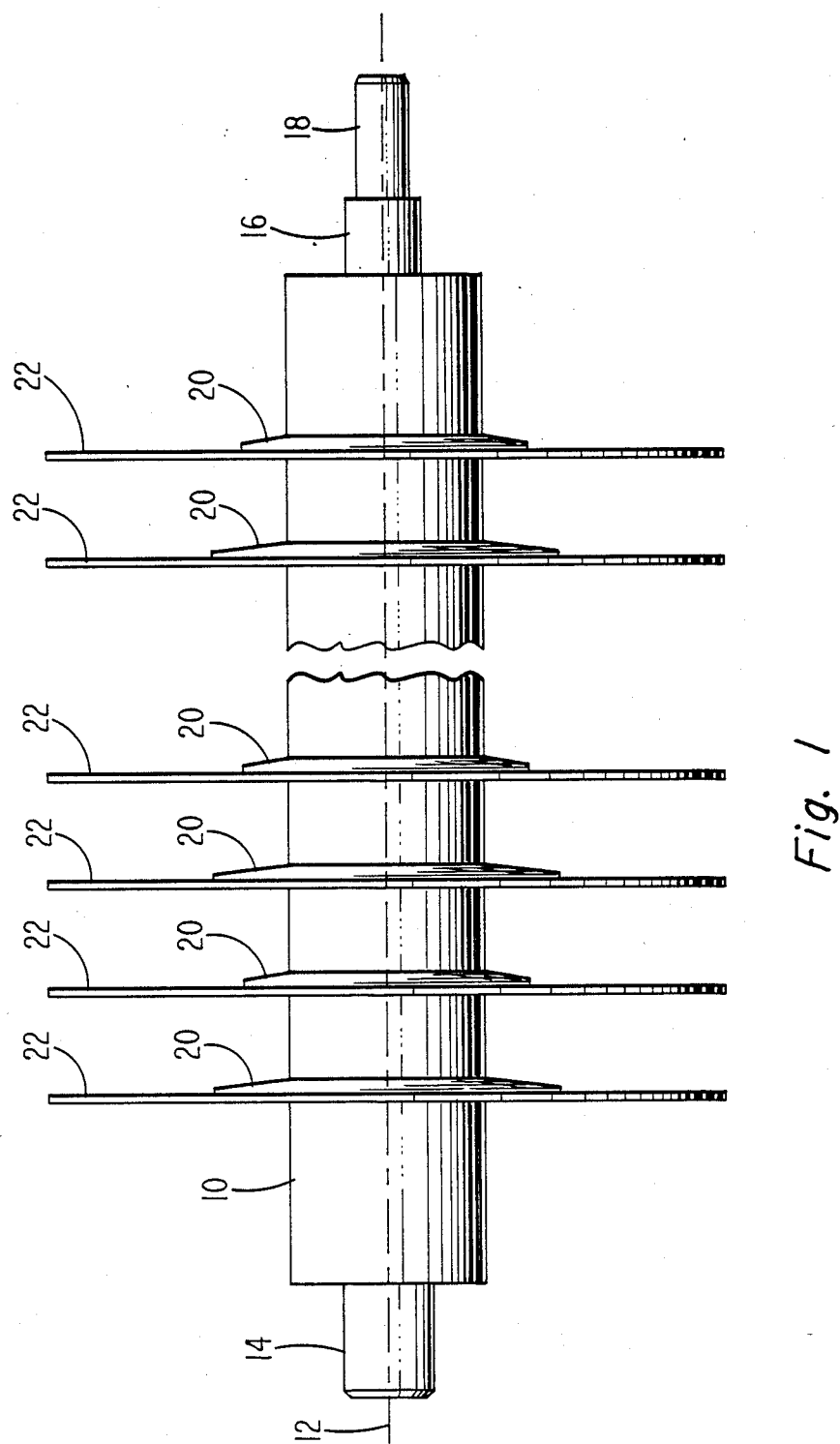
FIG. 1 illustrates a multidisk spindle in accordance with the present invention.

Referring to FIG. 1, there is shown a multidisk spindle according to the preferred embodiment of the present invention. The spindle includes shaft 10 adapted for rotation about longitudinal central axis 12. At each end of shaft 10 are coaxial sections 14, 16 of reduced diameters for bearing support. At the extremity of one end of shaft 10 is another coaxial section 18 which is adapted to be coupled to a rotational driving force, such as a motor (not shown), for rotating shaft 10 about axis 12.

The spindle of FIG. 1 further includes a plurality of disk-mounting plates, referred to collectively as plates 20, typically twelve in number, although a lesser quantity is illustrated. Attached to each plate 20 is a disk 22, typically a disk having one or both of its plane surfaces coated with a substance adapted for the storage and retrieval of information by an optical process. The plane surfaces of plates 20 against which disks 22 are held maintain disks 22 perpendicular to rotational axis 12 of shaft 10. In addition, although it is not a necessary limitation on the invention, plates 20 are mounted on shaft 10 such that disks 22 are substantially equally spaced from each other.

Figure 2:
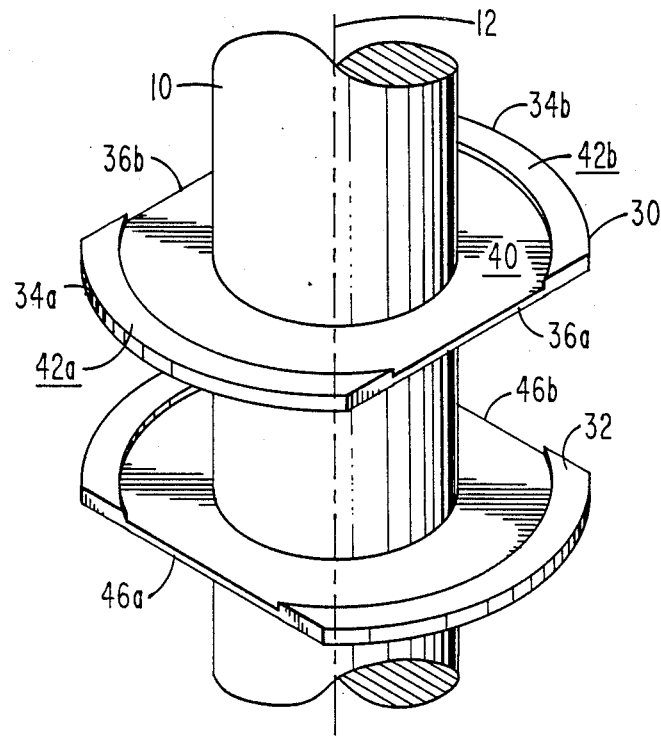
FIG. 2 illustrates mounting plates for use in the spindle of FIG. 1.

FIG. 2 provides an orthogonal view of a portion of the multidisk spindle according to the present invention. In this view, two mounting plates 30 and 32 are shown affixed to the illustrated portion of shaft 10. The upward facing surfaces of plates 30, 32 are the surfaces against which a record disk is mounted. The outer peripheral edge of each mounting plate, illustratively plate 30, comprises two arcuate curves 34a and 34b and two straight segments 36a and 36b. Curves 34a and 34b are substantially equal in length and comprose arcs of a circle having its center on central axis 12 of shaft 10. Straight segments 36a and 36b are of substantially equal length and are substantially parallel to each other.

The upward facing surface of plate 30 includes a recessed portion 40 which may be formed by grinding down a central portion of plate 30 in a circular shape concentric with central axis 12. In the present example, the diameter of the circular recess 40 is greater that the distance between straight segments 36a and 36b, leaving only annular segments 42a and 42b raised above the recessed area 40. Annular segments 42a and 42b comprise the plane surfaces upon which a disk record is mounted.

Illustratively, the significant dimensions of mounting plate 30 may be as follows: overall diameter, i.e., distance between curves 34a and 34b, of 7.25 inches; diameter of recess 40 of 6.75 inches; and distance between straight segments 36a and 36b of 6.0 inches. Thus, the width of the disk-mounting surfaces 42a and 42b is seen to be 0.25 inch. It will be observed in FIG. 3 that a disk record having the industry-standard central aperture of 6.75 inches has its inner edge aligned with the inside edge of surfaces 42a and 42b In addition, the surface of recess 40 is typically 0.06 inch below surfaces 42a and 42b.

As shown in FIG. 2, mounting plates 30 and 32 are oriented such that their straight edges 36a, 36b and 46a, 46b are substantially perpendicular as between the two plates 30, 32. This configuration, when applied to the assembly depicted in FIG. 1, requires a 90-degree alternation between adjacent mounting plates 20 along the length of shaft 10. Although this configuration is not a necessary limitation on the invention, it may provide more facility in the manual process of mounting the record disks to their respective mounting plates as described below with reference to FIG. 3.

Figure 3:
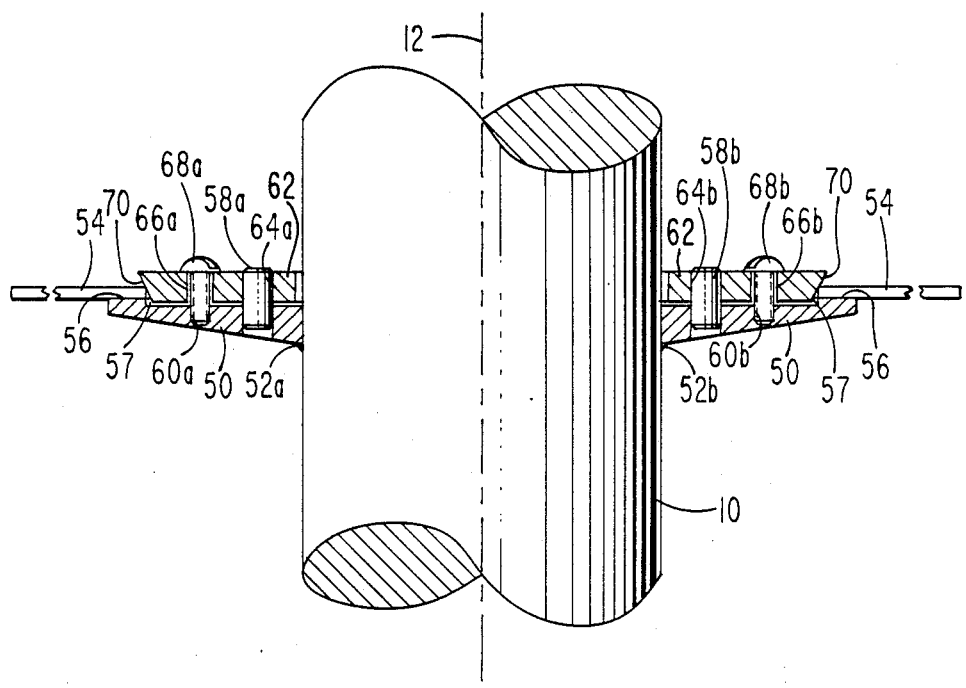
FIG. 3 is a cross-sectional view of a mounting plate of the FIG. 1 embodiment, illustrating disk alignment apparatus for use therewith.

Referring to FIG. 3, there is shown a portion of shaft 10 including a cross section of one mounting plate 50. Mounting plate 50 is affixed to shaft 10 by a welding process indicated by welding beads 52a and 52b, which may represent a plurality of discrete welding spots or a single weld bead around the circumference of shaft 10.

Mounting plate 50 includes two alignment pins 58a, 58b projecting upward on the disk mounting side of plate 50 from the recessed area 57. Mounting plate 50 further includes threaded holes 60a, 60b in the recess 57 of plate 50 adjacent pins 58a, 58b. In the preferred embodiment, mounting plate 50 includes four threaded holes 60—two adjacent each alignment pin 58.

Record disk 54 rests against plane mounting surface 56 of mounting plate 50. Centering cone 62, which includes holes 64a, 64b and 66a, 66b, corresponding in position to alignment pins 58a, 58b and threaded holes 60a, 60b, respectively, is mounted via screws 68a, 68b such that its beveled surface 70 contacts record disk 54, aligning it centrally with respect to central axis 12 of shaft 10. As screws 68a, 68b are drawn tight, disk 54 is securely held against plane surface 56 before centering cone 62 contacts mounting plate 50 in recess 57. The angle of bevel of the conical surface 70 of cone 62 may typically be eight degrees.

FIGS. 4a through 4d are a sequence of drawings which are useful in understanding a procedure for mounting a record disk 80 onto a mounting plate 82 affixed to shaft 10. Recapitulating the dimensional limitations, record disk 80 has a circular central aperture having diameter which is greater than the distance between the straight peripheral segments 36a, 36b (see FIG. 2), and therefore greater than the diameter of shaft 10, but which is less than the diameter of the circle formed by arcuate segments 34a, 34b (see FIG. 2).

For ease of understanding, the three mounting plates 78, 82 and 84 illustrated in FIGS. 4a through 4d do not exhibit the positional rotation between alternate plates which is shown in FIG. 2. Furthermore, FIGS. 4a through 4d depict the multidisk spindle having its mounting plates 78, 82 and 84 oriented such that their straight segments 36a, 36b (see FIG. 2) are parallel to the drawing sheet.

It is the object of the procedure illustrated by FIGS. 4a through 4d to mount disk 80 against mounting plate 82, given the expressed dimensional limitations. Obviously, the procedure to move disk 80 past mounting plate 84 may be applied to any number of plates interposed between the current position of disk 80 and its intended mounting plate.

Figure 4A:
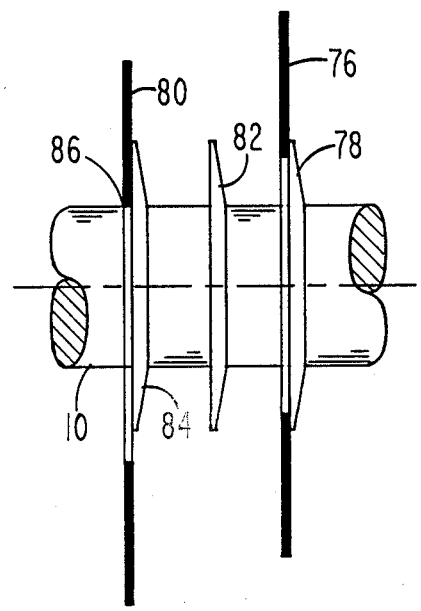
FIGS. 4a through 4d illustrate a method of mounting a record disk on the spindle of FIG. 1.

Referring to FIG. 4a, it is intended to move record disk 80 past mounting plate 84 such that it can be mounted against mounting plate 82. Initially, disk 80 is positioned close to plate 84 and resting against or near point 86 at the top of shaft 10.

Figure 4B:
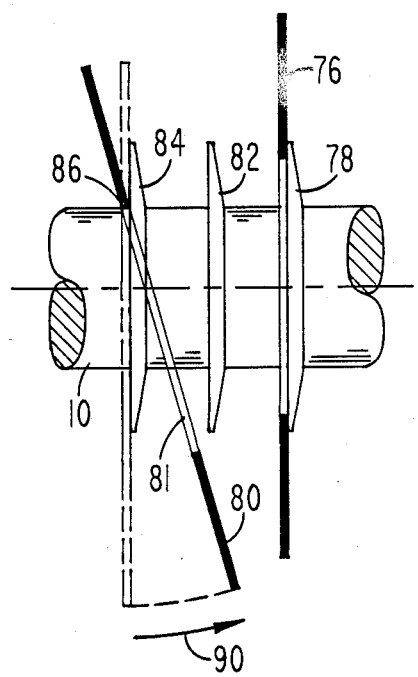
Figure 4C:
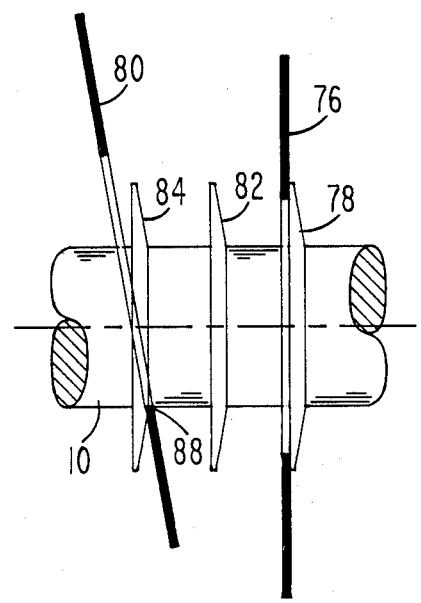
Figure 4D:
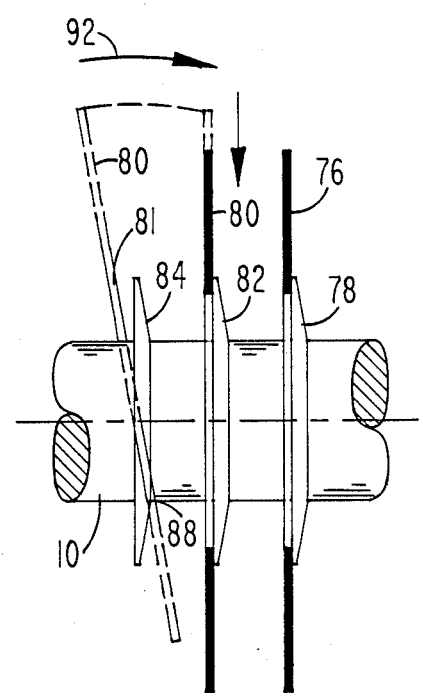

Referring to FIG. 4b, the bottom of disk 80 is pivoted about point 86, in the direction indicated by arrow 90, until its central aperture 81 clears the bottom of mounting plate 84. In FIG. 4c, it is seen that disk 80 is moved diagonally upward until it touches or is positioned close to point 88 on the bottom of shaft 10. Finally, FIG. 4d shows how disk 80 is pivoted about point 88 in the direction indicated by arrow 92, until its central aperture 81 clears the top of plate 84. Record disk 80 is then in condition to be positioned against mounting plate 82 to be affixed thereto.

The shape of mounting plates 78, 82 and 84 and their dimensions relative to central aperture 81 of record disk 80 permit the multidisk spindle of the present invention to be assembled before record disks are mounted thereto. It is this aspect of the present invention that provides the confidence that when the record disks are mounted against their respective mounting plates, the mounted record disks will all be parallel to each other and perpendicular to the longitudinal central axis of the shaft.

Figure 5:
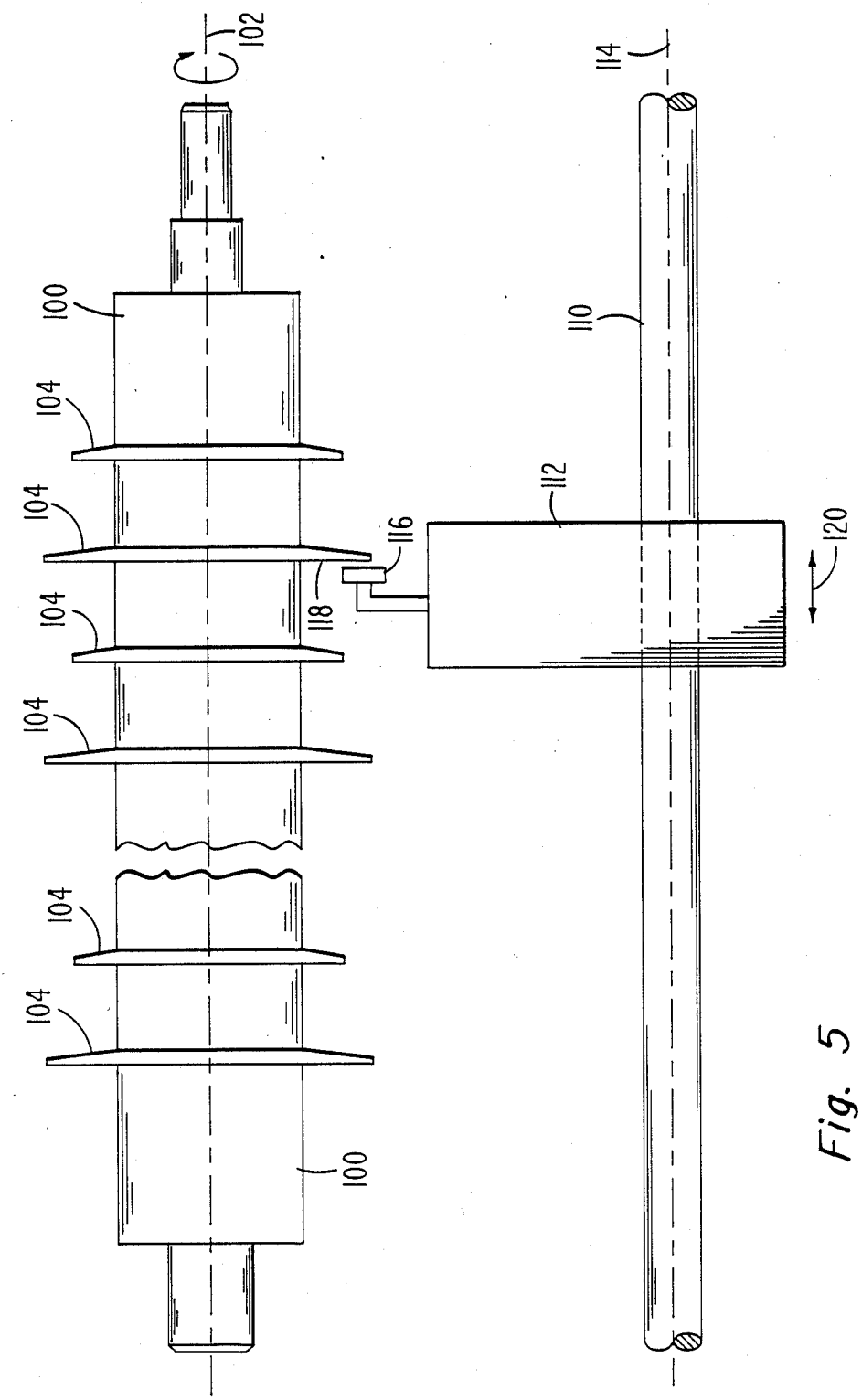
FIG. 5 illustrates an apparatus for finishing the disk-mounting surfaces of the mounting plates of the FIG. 1 spindle.

Referring to FIG. 5, there is shown a spindle 101 comprising a shaft 100 and a plurality of disk-mounting plates 104 of the type and configuration described earlier with reference to FIG. 2. Before disks are mounted against plates 104, their mounting surfaces 118 are prepared for the mounting by a finishing process. Spindle 101 is driven into rotation about central axis 112 by drive means not shown in the figure.

Finishing apparatus 112 is mounted, typically by a bearing arrangement, to rail 110. The longitudinal central axis 114 of rail 110 is parallel to rotational axis 102. Finishing apparatus 112 includes surface abrading means 116, typically a grinding wheel, which finishes the disk-mounting surfaces 118 of mounting plates 102. Since finishing apparatus 112 is constrained to move only in a direction which is parallel to axes 102 and 114, as indicated by arrow 120, then for a proper fixed orientation of grinding wheel 116 with respect to axis 102, all disk-mounting surfaces 118 of plates 104 will be parallel to each other and perpendicular to the axis of rotation 102 of spindle 101.

While the principles of the present invention have been demonstrated with particular regard to the illustrated structure of the figures, it will be recognized that various departures from such illustrative structure may be undertaken in the practice of the invention. The scope of this invention is not intended to be limited to the structure disclosed herein but should instead be gauged by the breadth of the claims which follow.

What is claimed is:

1. A spindle for mounting a plurality of record disks, said record disks each having a surface for storing information thereon and having a generally circular central aperture of predetermined diameter, said spindle comprising:
   a shaft having an outer diameter less than said predetermined diameter of said central aperture; and
   a plurality of mounting plates affixed to said shaft, each of said mounting plates having a flat surface for mounting a record disk thereagainst such that said information surfaces of said mounted disks are parallel to each other and are perpendicular to the longitudinal axis of said shaft,
   said flat surface of each of said plurality of mounting plates having an outer peripheral edge comprising two arcuate curves of substantially equal length interposed between two straight segments of substantially equal length and substantially parallel to each other, wherein the arcuate curves comprise arcs of a circle having its center on the longitudinal axis of said shaft and having diameter greater than said predetermined diameter of said record disk central aperture, and wherein the distance between said two straight segments is less than said predetermined diameter of said record disk central aperture.

2. The spindle according to claim 1 wherein said plurality of mounting plates are welded to said shaft.

3. The spindle according to claim 1 wherein said plurality of mounting plates are affixed to said shaft such that said two straight segments on said outer peripheral edge of each of said mounting plates are substantially perpendicular to said two straight segments or said outer peripheral edge of an adjacent mounting plate.

4. The spindle according to claim 1 including twelve mounting plates.

5. A multidisk spindle comprising:
   a shaft having a predetermined maximum diameter and a longitudinal central axis;
   a plurality of mounting plates affixed to said shaft, each of said mounting plates having a flat surface which is perpendicular to said longitudinal axis of said shaft, said flat surface of each of said plurality of mounting plates having an outer peripheral edge comprising two arcuate curves of substantially equal length interposed between two straight segments of substantially equal length and substantially parallel to each other, wherein the arcuate curves comprise arcs of a circle having its center on said longitudinal axis of said shaft and having a predetermined diameter; and
   an equal plurality of said record disks affixed respectively to said plurality of mounting plates, said record disks having a plane surface against said flat surface of said mounting plates, each of said plurality of record disks having a generally circular central aperture having diameter greater than said predetermined maximum diameter of said shaft and greater than the distance between said two straight segments of said outer peripheral edge of said mounting plates, said aperture diameter being less than said predetermined diameter of said circle including said arcuate curves of said outer peripheral edge of said mounting plates.

6. The spindle to claim 5 wherein a first plane surface of each of said plurality record disks includes a coating of a magneto-optic substance for effecting reversible recordings thereon.

7. The spindle according to claim 6 wherein a second plane surface of each of said plurality of record disks additionally includes a coating of a magneto-optic substance for effecting reversible recordings thereon.

8. The spindle according to claim 5 wherein said plurality of mounting plates are welded to said shaft.

9. The spindle according to claim 5 wherein said plurality of mounting plates are affixed to said shaft such that said two straight segments of said outer peripheral edge of each of said mounting plates are substantially perpendicular to said two straight segments on said outer peripheral edge of an adjacent mounting plate.

10. The spindle according to claim 5 including twelve mounting plates.

11. The spindle according to claim 5 wherein said plurality of record disks are substantially circular and are affixed to said respective mounting plates so as to be substantially concentric with said longitudinal axis of said shaft.

* * * * *